United States Patent [19]

Kizer

[11] Patent Number: 5,593,265
[45] Date of Patent: Jan. 14, 1997

[54] QUICK-CONNECT STORED ENERGY TORSIONAL FASTENER

[75] Inventor: Thomas L. Kizer, Farmington Hills, Mich.

[73] Assignee: Chrysler Corporation, Auburn Hills, Mich.

[21] Appl. No.: 515,848

[22] Filed: Aug. 16, 1995

[51] Int. Cl.6 .............................. F16B 21/00; B25G 3/18
[52] U.S. Cl. ..................... 411/552; 411/350; 411/553; 403/325; 403/348
[58] Field of Search .................... 411/231, 350, 411/352, 551, 552, 553; 403/325, 348, 349

[56] References Cited

U.S. PATENT DOCUMENTS

| | | |
|---|---|---|
| 892,333 | 6/1908 | Traub . |
| 1,287,220 | 12/1918 | Carr . |
| 1,298,251 | 3/1919 | Pehel . |
| 1,334,845 | 3/1920 | Dulac et al. . |
| 1,652,575 | 12/1927 | McGinley . |
| 2,462,141 | 2/1949 | Storer . |
| 3,163,017 | 6/1964 | Preziosi . |
| 3,345,711 | 10/1967 | McCarthy . |
| 3,861,004 | 1/1975 | Schenk ............................... 24/204 |
| 3,874,041 | 4/1975 | Smith ................................. 24/221 |
| 3,943,611 | 3/1976 | Schenk ............................... 24/203 |
| 3,975,804 | 8/1976 | Schenk ............................... 24/221 |
| 4,043,239 | 8/1977 | DeFusco . |
| 4,130,929 | 12/1978 | Dzus .................................. 29/456 |
| 4,186,952 | 2/1980 | Glass ................................. 292/202 |
| 4,385,851 | 5/1983 | Bellamy ............................. 403/406 |
| 4,719,665 | 1/1988 | Bell ................................... 16/232 |
| 4,720,223 | 1/1988 | Neights et al. ....................... 411/11 |
| 4,732,505 | 3/1988 | Gloystein ........................... 403/348 X |

*Primary Examiner*—Neill R. Wilson
*Attorney, Agent, or Firm*—Thomas G. Pasternak

[57] ABSTRACT

A stored energy torsional rotary fastener device providing ready releasable attachment of first and second components. A fastener housing, attached to the first component, includes a cylindrical socket having an upper open end and a lower end configured by a pair of base segments defining a cross-slot the parallel edges of which are formed with concentrically disposed arcuate cutouts. The segments have interior helical pitched ramp portions establishing an interrupted thread support. A rotor, including an axial stem terminating in a radial disc axially positioned in the socket, is rotatably biased by a coiled spring interconnecting the rotor and housing. The rotor disc is formed with a depending axial hub having its lower portion journalled in the slot cutouts. The hub upper end includes oppositely extending radial lugs, with each lug underface formed with a helical pitch adapted to mate with an associated ramp portion, enabling axial threaded rotor travel. The hub terminates in an annular shoulder, encircling a lower axial stem, which stem ends in a cross-head adapted to extend through the cross-slot, with the cross-head providing an upwardly facing engaging surface. Threading the rotor in one direction advances it to a "cocked and armed" mode with the lugs having diametrically opposite corner junctures rotatably biased against an associated cross-slot edge. Upon the cross-head being inserted through a second component mating slot the shoulder is displaced upwardly releasing the lugs, whereby the spring threads the rotor in the opposite direction such that the cross-head urges the components into engagement.

18 Claims, 6 Drawing Sheets

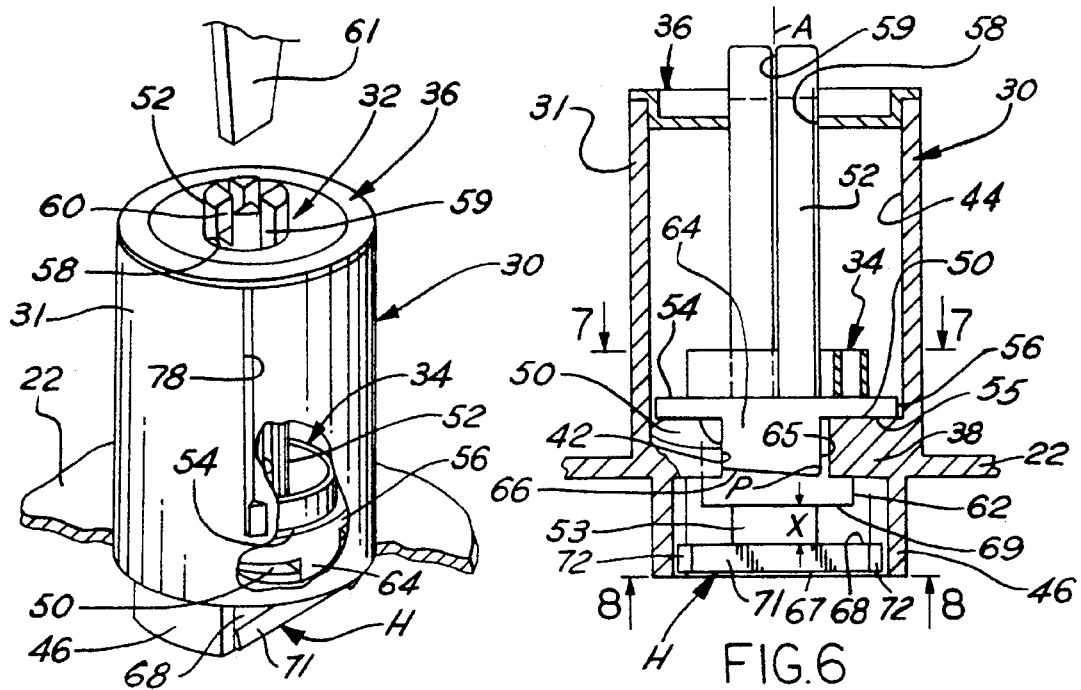
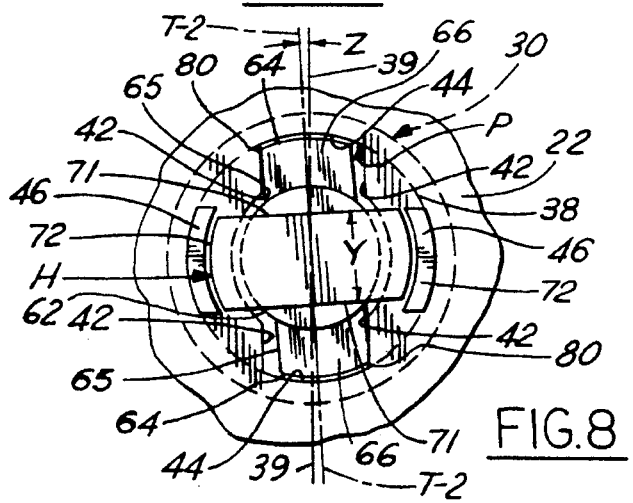
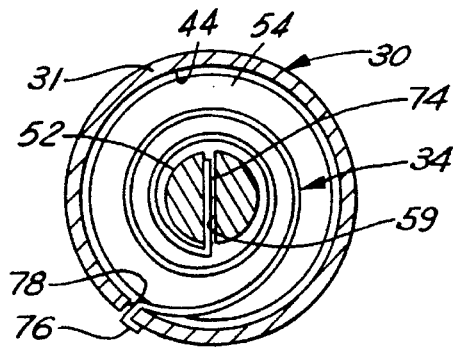
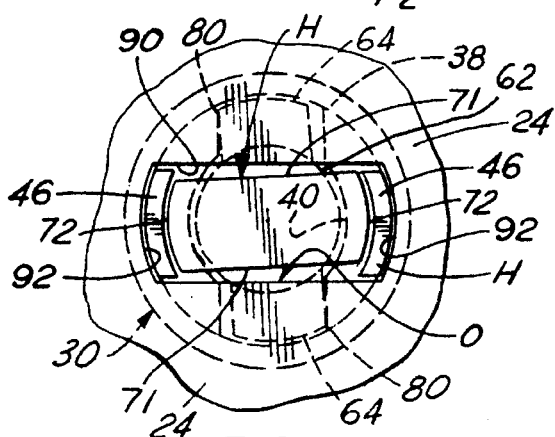
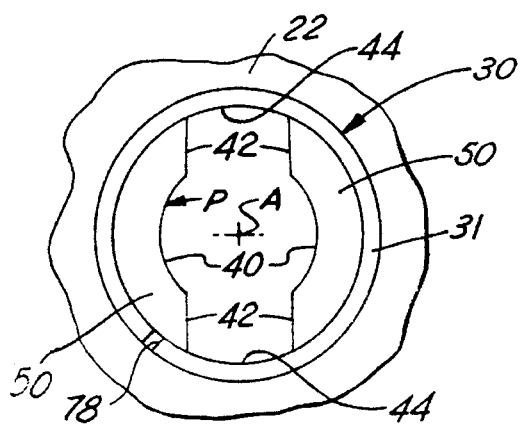

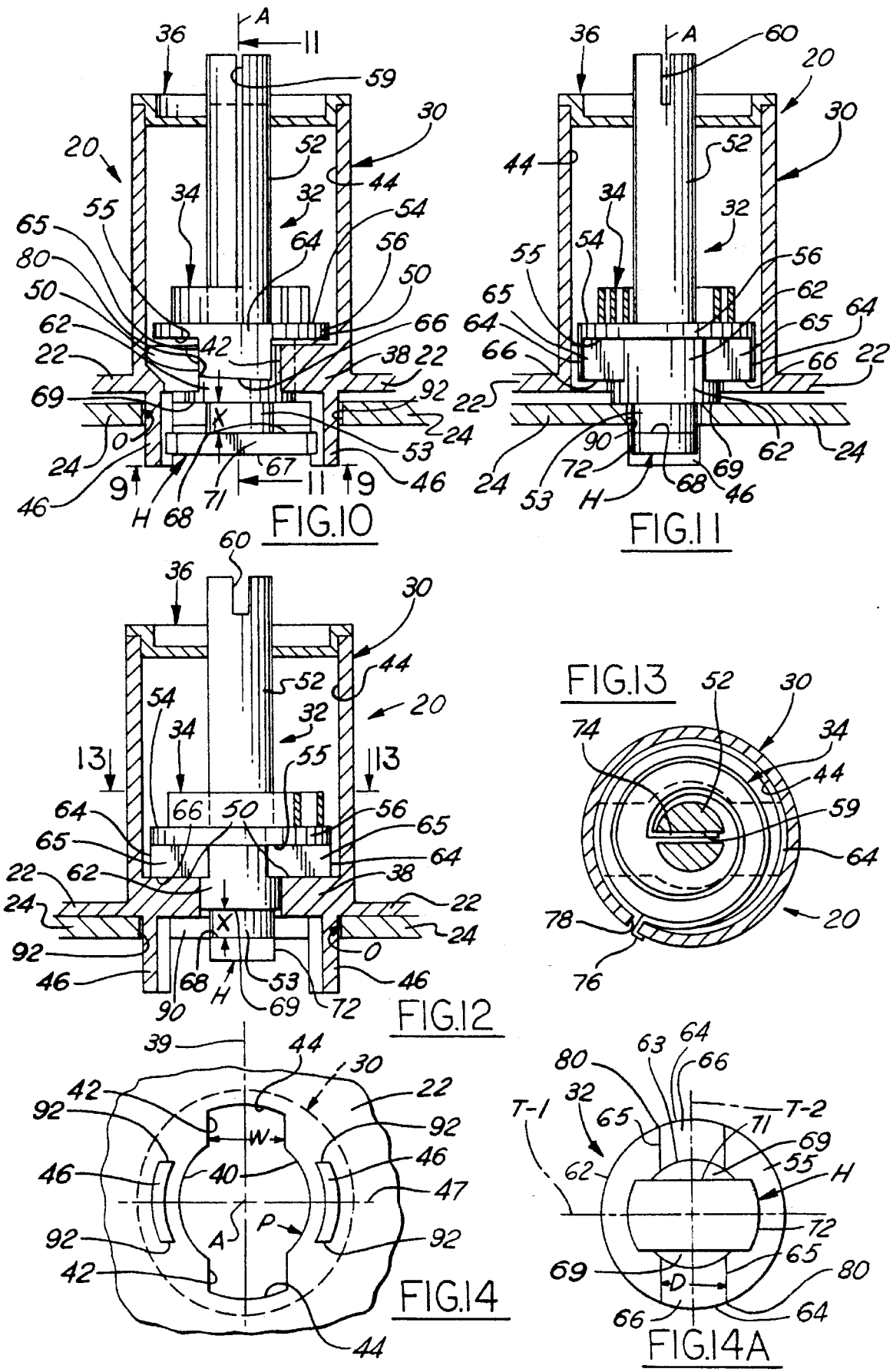

QUICK-CONNECT STORED ENERGY TORSIONAL FASTENER

BACKGROUND OF THE INVENTION

This invention relates generally to quick connect rotary fastener devices and more particularly to a stored energy torsional fastener device for removably fastening first and second components in a blind quick-connect manner such as, for example, during production line assembly of motor vehicles. An example of a prior art threadless type quick-action fastening device is shown in U.S. Pat. No. 2,462,141 issued Feb. 22, 1949 to Storer. The Storer patent discloses a device for fastening two parts together which may be readily locked and unlocked as by turning a stud by means of screw driver or coin. The Storer device includes a stud rotatably attached to one part and a base attached to the other part, with the base having a plurality of inclined cam surfaces. The stud is provided with laterally extending wings for engaging and moving relatively upwardly along the cam surfaces upon rotation of the stud. A spring exerts a pull producing a torque on the wings causing the wings to climb up the cam surfaces and thereby tighten the connection. The fastening art includes a variety of quick-connect devices that utilize various means to connect two members by means of elastic energy. Examples of this art are U.S. Pat. Nos. 892,333 to C. J. Teaub; 1,287,220 to F. S. Carr; 1,298,251 to Z. Pehel; 1,334,845 to T. C. Dulac et al.; 1,652,575 to G. M. McGinley; 3,136,017 to J. R. Priziosi; 3,345,711 to J. J. McCarthy; 3,861,004 to P. Schenk; 3,874,041 to H. J. L. Smith; 3,943,611 to P. Schenk; 3,975,804 to P. Schenk; 4,043,239 to E. L. Defusco; 4,130,929 to J. F. Dzus; 4,186,952 to D. W. Glass; 4,385,851 to R. Bellamy; 4,720,223 to P. D. Neights et al.

SUMMARY OF THE INVENTION

It is a feature of the present invention to provide a quick-connect stored energy fastening device for releasably securing two components in face-to-face blind contact whereby stored elastic energy means continually urges the components together insuring that they will remain in tight positive engagement during their design service life.

It is a further feature of the present invention to provide a quick-connect stored energy fastening device as set forth above wherein the action of installing the fastener triggers and releases resilient torsional energy means thereby automatically locking the two components together in a readily releasable manner.

It is another feature of the present invention to provide a quick-connect stored energy torsional fastener device that is economical to make, has a long reusable service life while requiring minimal labor and tooling to assemble.

In a preferred embodiment, there is provided a quick-connect torsional fastener device comprising a hollow tubular cylindrical shaped housing socket adapted to receive a rotor for turning movement therein. The rotor is inserted into an open end of the socket with the housing other end partially closed by a pair of base segments. The segments define a cross-slot formed with a pair of opposed arcuate cutouts having a common center aligned on the principal axis of the socket. The rotor comprises an elongated upper stem projecting upwardly from an annular disc upper support surface through an aligned opening in a cap member adapted to close the socket open end. The disc peripheral edge has a predetermined diameter sized to move in a guided slip-fitted relationship within the socket cylindrical interior enabling both axial and rotary movement therebetween. A concentric hub portion, having a reduced diameter, projects a predetermined dimension axially from the disc undersurface. An axially extending lower stem, which depends from the hub undersurface, defines an annular stop shoulder.

The lower stem ends in a latching cross-head aligned on a diametrical axis with the cross-head adapted for reception in the socket cross-slot. The cross-head has a generally rectangular shape in plan defining a pair of parallel sides and a pair of arcuate end edges conforming, in a close fit manner, to the cross-slot permitting travel therethrough. The rotor cylindrical hub is sized for journalled reception in the opposed arcuate cutouts enabling rotation of the rotor about the socket principal axis.

A pair of diametrically opposed lugs, extending radially outwardly from the hub, are aligned on a second diametrical axis positioned ninety degrees to the axis of the cross-head. Each of the lugs are formed with a downwardly facing serially contoured cam face concentrically disposed about the socket principal axis. Each cam face is adapted to mate, in an axially opposed complementary manner, with an associated one of a pair of spirally contoured ramps formed on the interior surface of respective base segments. This arrangement allows the rotor to undergo threaded travel in response to winding in either a clockwise or a counterclockwise direction by the lug cam faces riding on their respective segment ramps. The lugs define a pair of diametrically opposite corner junctures biased into line contact with an associated cross-slot edge providing a "cocked and armed" mode.

A spiral winding spring, provided within the socket, includes an inner end connected to the upper stem portion and an outer end connected to the socket. Thus, with the latching cross-head inserted through the socket cross-slot the spring is operative to thread the rotor axially. The rotor is wound a minimum of 180 degrees in a first counter-clockwise direction together with any additional angle required to permit the cross-head to pass through the socket cross-slot. The rotor is wound until the rotor lug corner junctures engage their associated cross-slot edges placing the fastener device in its "cocked and armed" mode ready for installation. Upon the cross-head being inserted through a second component mating slot the rotor shoulder is displaced upwardly releasing the lugs, whereby the spring threads the rotor in a clockwise direction such that the cross-head urges the components into engagement.

BRIEF DESCRIPTION OF THE DRAWINGS

The present invention will be better understood by reference to the following detailed description of a preferred embodiment when read in conjunction with the accompanying drawings in which like reference characters refer to like parts throughout the view and in which:

FIG. 5 is a fragmentary perspective view, with parts broken away, showing the fastening device in its "cocked and armed" mode;

FIG. 6 is a fragmentary vertical sectional view, partly in elevation, of the fastening device of FIG. 5; FIG. 7 is a horizontal sectional view taken on the line 7—7 of FIG. 6;

FIG. 8 is a fragmentary end plan view taken in the plane 8—8 of FIG. 6;

FIG. 9 is a fragmentary end plan view taken in the plane 9—9 of FIG. 10 showing the fastening device in its "cocked and armed" mode partially inserted into a mounting panel aperture;

FIG. 9A is a detail top view of the fastening device housing showing the base wall and its elongated slotted aperture;

FIG. 10 is a fragmentary vertical sectional view, partly in elevation, showing the fastening device in a "cocked and armed" mode partially inserted in a mounting panel aperture; FIG. 11 is a view similar to FIG. 10 showing the fastening device rotated ninety degrees from its FIG. 10 position;

FIG. 12 is a fragmentary vertical sectional view, partly in elevation showing the device in its "fired" mode;

FIG. 13 is a horizontal sectional view taken on the line 13—13 of FIG. 12;

FIG. 14 is a fragmentary bottom end view of the fastening device housing;

FIG. 14A is a detail view of the rotor lower end;

DETAILED DESCRIPTION OF THE INVENTION

Figure 1:
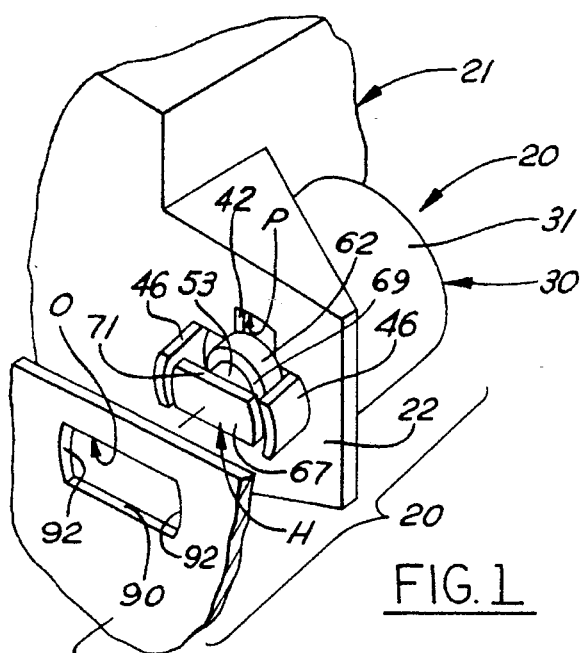
FIG. 1 is a fragmentary perspective view of the fastening device of the present invention prior to installation according to the present invention.
Figure 2:
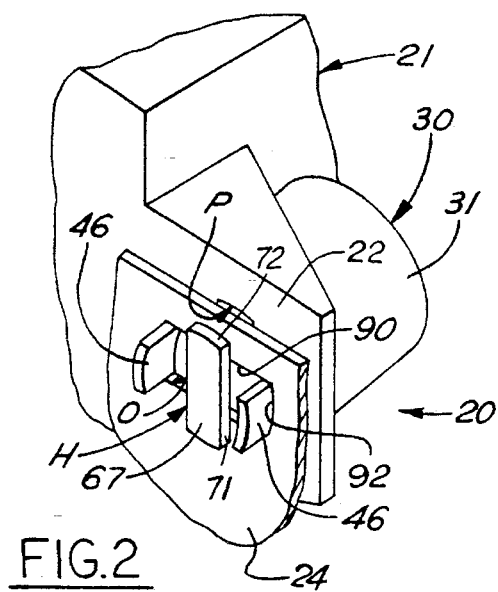
FIG. 2 is a view similar to FIG. 1 showing the fastening device in its installed "fired" mode.

Referring now to the drawings and more particularly to FIG. 1–14A there is shown a first embodiment of the present invention. FIGS. 1 and 2 depict a quick-action stored energy torsional fastener device, generally indicated at 20, provided for releasably securing together respective first and second members, assemblies, or the like. In the disclosed form the first member comprises a vehicle component or sub-assembly 21 formed with an integral mounting wall portion 22 and the second member is a vehicle body structural panel 24. The wall portion 22 is adapted for flatwise or flush mating support on the body panel 24 in face-to-face contact. It will be appreciated that limitless number of components and configurations of readily removable parts or components are contemplated for use with the quick connect fastener device of the present invention and the elements 21 and 24 are shown only for the purposes of illustration.

Figure 3:
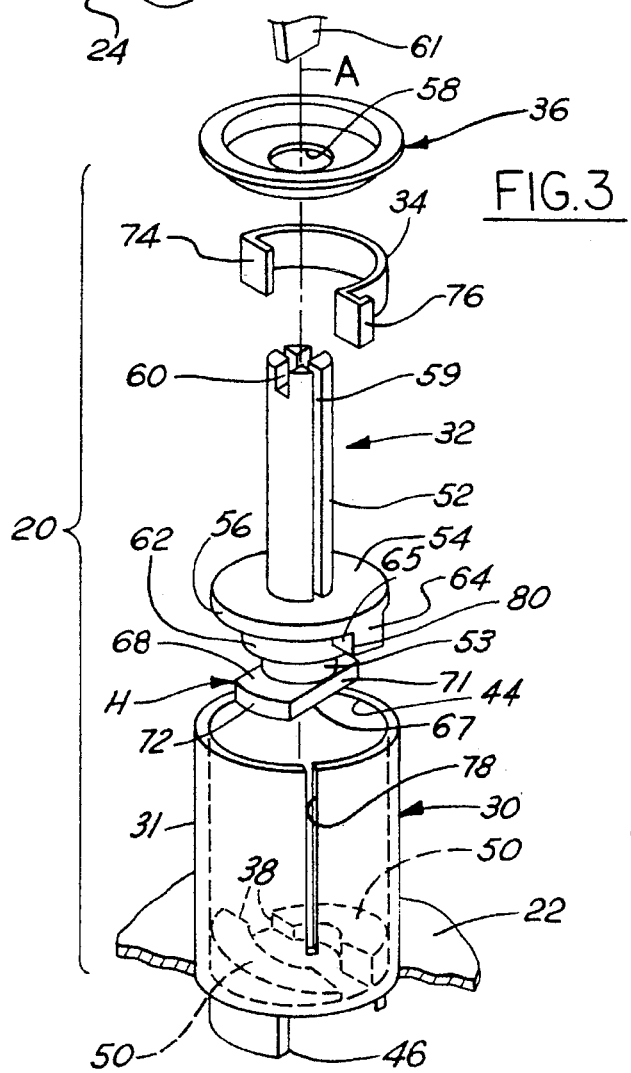
FIG. 3 is a fragmentary exploded perspective view of the fastening device as viewed from above.
Figure 4:
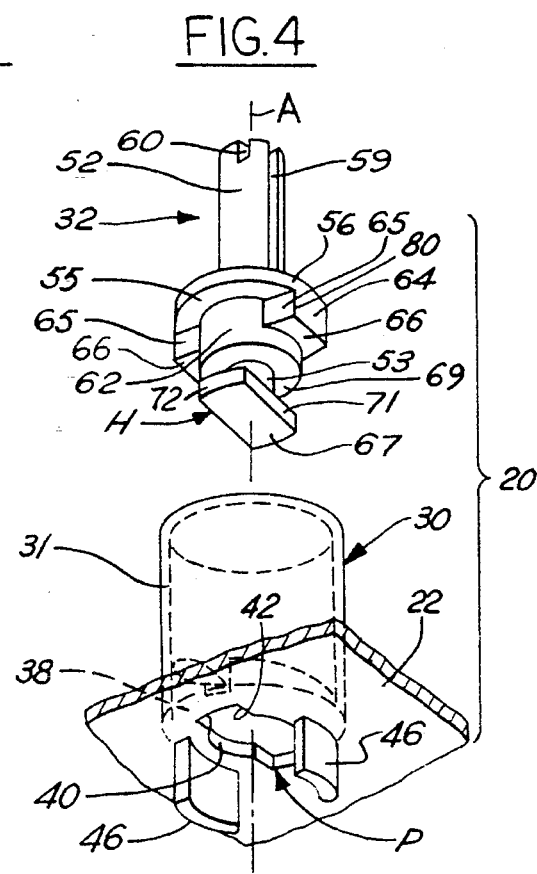
FIG. 4 is a fragmentary exploded perspective view of the fastening device housing and rotor as viewed from below.

As best shown in FIGS. 3 and 4 the fastener device 20 comprises a tubular cylindrical-shaped housing 30, a rotor 32, spring biasing means such as coiled spring 34, and rotor support means such as an end closure in the form of a cap member 36. It will be noted that the rotor 32 is preferably constructed as one-piece by suitable means from various materials such as injection molded plastic, die cast metal, one-piece machined metal or the like. Further, the spring means in the disclosed embodiment is a spiral wound flat spring strip 34 constructed of either stainless steel or carbon steel and is referred to by various names such as "power spring" "motor spring" "flat coil spring" or "clock spring" It will be noted, however, that other types of rotor torsional spring biasing means are contemplated which achieve rotor stored energy relative to the housing thereby permitting the rotor to be cocked without removing it from the surface to which it is fastened. FIGS. 1–6 show the housing defining a cylindrical side wall 31 integrally formed at its lower end with a horizontally disposed panel or mounting flange portion 22 of the component 21.

With reference to FIGS. 4, 6 and 8 it will be seen that the housing 30 has its lower one end formed with integral lower end wall or base segments 38 defining an elongated slotted passage or cross-slot "P" having parallel edges 42 symmetrically disposed about housing diametrical axis 39 (FIG. 14). As best seen in FIG. 9A the cross-slot side edges 42 are formed with a pair of opposed mirror image cutouts 40, having a common center of curvature aligned on the housing principal axis "A" It will be noted in FIG. 14 that the pair of arcuate cutouts 40 define opposed arcuate rotor bearing races, concentrically disposed about axis "A" sized to rotatably support a journal hub 62 of the rotor 32 (FIG. 14A) for rotation on the axis "A". Each arcuate bearing race or cutout 40 subtends a radial angle of about one hundred and twenty degrees (120 degrees) in the preferred embodiment.

As seen in FIG. 14 the cross-slot "P" is defined by a pair of opposite mirror image slot ends each defined by parallel side edges 42 and an arcuate end segment of rotor axial cylindrical socket 44. It will be noted in FIGS. 12 and 14 that the underside of each housing base wall portion 38 has guard means thereon in the form of a pair of mirror image mutually opposed downwardly extending guards 46. The pair of guards 46, which also function as lead-in guides, have a concavo-convex shape when viewed in horizontal section and have a common center of curvature aligned on the housing principal axis "A". FIG. 14 shows the pair of guards 46 disposed about a transverse axis of symmetry 47 with the axis 47 oriented ninety degrees to the cross-slot axis of symmetry 39. As best seen in FIG. 8 each arcuate guard 46 has an overall size which, when viewed in horizontal section, defines a chord having a transverse length which slightly exceeds the width "Y" of the rotor latching cross-head "H".

With reference to FIGS. 3 and 6 it will seen that the housing lower end base segments 38 define a pair of diametrically opposed upwardly facing spiral ramp surface portions 50 symmetrically disposed about axis "A" on either side of the cross-slot "P". The ramp portions 50 provide a right-hand screw thread, interrupted by the cross-slot, having a predetermined thread pitch for a purpose to be explained below.

FIGS. 3 and 4 show the rotor 32 comprising an elongated upstanding stem 52 stem extending from an upper surface of a radial disc 54. Upon the rotor 32 being concentrically installed in the housing socket 44 the stem 52 is aligned on the housing principal axis "A". A concentrically disposed hub 62 projects downwardly from an underside 55 of the disc 54 with a lower connecting stem portion 53 depending from hub undersurface 69. The rotor disc 54 outer cylindrical edge 56 has a predetermined diameter sized for both axial and rotary close tolerance movement within the housing axial bore 44.

With reference to FIG. 5 and 6 the rotor stem 52 is shown extending in one axial direction outwardly through the housing open end. Upon the cap member 36 being seated to close the housing the rotor is received through an aligned circular opening 58 of the cap member 36. It will be noted in FIG. 3 that the stem 52 has its upper end formed with a first diametrical spring slot 59 shown extending the full length of the major stem portion. A second diametrical tool slot 60 in the stem upper end, oriented at right-angles to the first slot 59, is sized for reception of a screw driver blade 61 enabling ready winding the rotor in a manner to be explained below.

As best seen in FIGS. 4 and 9 the rotor journal hub 62 has a predetermined diameter sized for journalled pivotal reception in the housing pair arcuate cutouts 40, as indicated by dashed lines 62 in FIG. 9. FIG. 4 shows the disc undersurface 55 formed with a pair of diametrically opposed lugs 64 extending radially from the hub 62. It will be noted in FIG. 14A that each lug has a pair of parallel side faces 65 spaced apart a predetermined dimension "D" slightly less than the width "W" (FIG. 14) between side edges 42 of the housing cross-slot "P". Thus, each rotor lug 64 is sized for reception in an associated end slot portion of the cross-slot "P" as seen in FIG. 8.

As best seen in assembled fastener of FIG. 6 each rotor lug 64 has a downwardly facing undercut spirally contoured cam face 66. The rotor pair of cam faces 66 are adapted to mate in a complementary screw thread manner with an associated one of the pair of axially opposed spirally contoured housing ramps 50. As a consequence, winding of the rotor upper stem portion 52 in a counter-clockwise direction by the screwdriver blade 61 causes the coiled spring torsional winding force to be stored in the spring 34. The rotor cam faces 66 travel counter-clockwise relative to their associated right-hand thread ramps 50 effecting downward axial travel of the rotor 32 in the housing socket 44 in response to the combined rotational and axial force of the screwdriver. Conversely, removal of the screwdriver from the rotor releases the coiled spring torsional winding force whereby the recovered force effects clockwise rotation and upward axial travel of the rotor 32 within the housing axial socket 44.

The lower one end of the rotor connecting stem portion 53 is joined to a latching cross-head "H" that is elongate in a direction normal to the principal axis of the rotor. As seen in FIG. 14A the cross-head "H" is aligned on a first diametrical axis "T-1" which intersects the rotor principal axis The pair of lugs 64 are shown aligned on a second diametrical axis "T-2" oriented ninety degrees or normal to the head axis "T-1". The cross-head "H" is sized for close-fit complementary reception in the housing cross-slot "P" allowing its passage therethrough.

With reference to FIGS. 6 and 8 the fastener device 20 is shown with its cross-head "H" axially extended to its "cocked and armed" mode. It will be noted that the latching cross-head has its upper engaging surface 68 spaced a predetermined axial dimension "X" from hub triggering shoulder 69. The dimension "X" equals the axial dimension of the rotor connecting stem portion 53.

FIG. 8 shows the cross-head "H" having a generally rectangular shape when viewed in plan defining a pair of parallel side edges 71 and a pair of mirror image convex arcuate end edges 72. The arcuate end edges have a common radius of curvature aligned on the rotor principal axis allowing the cross-head "H" to be rotated on the housing axis "A" in a concentric manner relative to the pair of arcuate shaped guards 46.

In FIG. 3 the coiled spring 34 is shown formed with a radially inner planar anchoring tongue portion 74 and a radially outer hook portion 76. With reference to FIG. 7 the coil spring inner end or tongue 74 is suitably anchored to the rotor stem 52. In the disclosed form of the invention the spring tongue is anchored by its reception in the stem spring slot 59. The coil spring outer end if formed with a hook 76 adapted to be anchored to the housing by suitable means such as by reception in a vertically extending housing slot 78, for example, as seen in FIG. 13.

With reference to FIGS. 3 and 6, an operator assembles the stored energy fastener device coiled spring 34 by first engaging the spring inner tongue 74 into the stem vertically extending full length diametrical slot 59. The rotor 32 and spring 34 sub-assembly is then inserted into the open end of the housing 30 while slidably guiding the spring outside hook 76 into a longitudinally extending spring external housing slot 78. The rotor cross-head "H" is inserted through the housing cross-slot "P" and the hub portion 53 journally received in the opposed pair of arcuate cutouts 40. As seen in FIG. 12 this results in the lug cam faces 66 being seated on their associated housing base segment ramps 50.

Next, by inserting the screwdriver blade 61 in the rotor tool slot 60 and rotating the rotor counter-clockwise 180 degrees to wind the spring, then applying an axial downward force and continuing to rotate the rotor, the rotor cam faces 66 slide on the ramps 50. The rotor 32 is wound counter-clockwise a predetermined rotary angle such that each lug 64 is received in its associated end slot portion of the housing cross-slot "P" providing the "cocked and armed" mode of FIG. 8. It will be noted in FIG. 8 that in this mode the cross-head "H" axis of symmetry T-2 is spring biased at a slight acute angle "Z" relative to the cross-slot axis of symmetry 39. In this manner the spring torque load biases a respective pair of diametrically opposite lug exterior axially extending corner junctures 80 (FIG. 14A) into line contact with their associated opposed cross-slot edges 42 (FIG. 14).

FIGS. 6 and 8 depict the fastening device 20 in its "cocked and armed" mode ready to be "fired". It will be noted in FIG. 6 that only a predetermined lower portion of each lug lower corner juncture 80 contacts its associated cross-slot edge 42 in the "cocked and armed" mode.

The cap 36 is shown in FIGS. 5 and 12 pressed into the open end of the housing 30, with the upper end of the first stem portion projecting through the central hole 58 in the cap rendering the housing 30 and the rotor 32 concentric with each other. It will be appreciated that the fastener device 20 is uniquely adapted for assembly in its "cocked and armed" mode.

This enables a manufacturer to ship the device to a component assembly plant with the rotor wound energy stored in the spring 34 available for triggering installation by the installer. That is, the fastener device 20 has an installation-ready "cocked and armed" mode wherein the rotor is preset i.e. the wound spring 34 stored energy being held in reserve, as indicated in FIGS. 5 and 6.

FIG. 1 shows the structural component in the form of fixed panel member 24 adapted for engagement by the fastening device by means of a slotted attachment opening "O". The opening "O" is so configured and sized that it allows ready reception therethrough of the cross-head "H" together with its pair of guides 46. In the disclosed embodiment panel opening "O" is in the form of an elongated through slot defined by a pair of opposed parallel side edges 90 joined by a pair of opposed arcuate end edges 92. It will be noted in FIG. 12 that the thickness of the panel 22 is substantially equal to but slightly less than dimension "X" between the latching cross-head engagement surface 68 and the opposed triggering shoulder 69 of the rotor hub 62. As seen in FIG. 9 the panel opening "O" is formed with its arcuate ends 92 having a diameter slightly greater than the diameter defining the outer surface of each housing guard 46. The pair of guard 46 are thus adapted to be snugly inserted through the panel slotted opening "O" to preposition the fastening device 20 in a determined manner relative to the panel.

With reference to the "cocked and armed" mode of the FIG. 10 fastener device assembly is shown with its pair of guards 46 partially inserted into the panel opening "O" such that the rotor triggering shoulder 69 initially contacts the opposed upper surface of the panel 24. FIGS. 10 and 11 depict an intermediate pre-firing step whereby further insertion of the pair of guards 46 causes the rotor lug cam faces 66 to be displaced axially upwardly from their associated housing cam ramps 50. In FIG. 10 it will be seen that each of a pair of diametrically opposite lug corner junctures 80 are about to be raised above and released from their associated housing cross-slot side edges 42.

In FIG. 11, viewed at ninety degrees to FIG. 10, it will be seen that the triggering shoulder 69 is in contact with the upper surface of the panel 24. Thus, further axial force exerted by the panel 24 on the triggering shoulder 69 disengages each lug corner juncture 80 from its associated side edge 42 releasing a portion of the torsional energy stored in the wound spring 34. The released torsional energy causes relative winding travel between the rotor 32 and the housing 30, producing rotary threaded axial travel between the rotor lug cam faces 66 and their associated housing ramp portions 50.

Upon being fired the rotor 32 is free to rotate clockwise, as viewed in FIG. 13, releasing a portion of the spring's stored energy causing the rotor lug cam faces 66 to thread upwardly on the housing ramp portions 50. The resulting rotor conjoint rotary and axial travel causes the latching head "H" to rotates about ninety degrees to a substantially right-angled "latched and installed" position relative to the panel elongate slot "O", while being urged axially upwardly to its "fired" mode of FIG. 12. The "lead" or predetermined axially upward rotor travel results in the stored spring torque urging or biasing the cross-head engaging surface portions 68 forcefully against the opposed undersurface of the panel 24 thereby applying a flush clamping load between the wall portion 22 and opposed panel 24.

It will be noted that the applied clamping load of the fastening device is a function of (1) the slope or "screw thread" angle of rotor lug cam faces 66 and the mating housing ramps 50, (2) the final spring torque, and (3) the coefficient of friction between each sliding cam face 66 and its associated ramp 50. The torque reaction applied to the housing 30 from the friction torque of the cross-head "H" on the panel 24 during the fastener device triggering sequence is countered by each diagonally opposite housing guard edge 92 (FIG. 14) bearing against its opposed panel opening side edge 90 (FIG. 1). As a consequence the installer senses no torque reaction force upon firing the fastener device during installation. The pair of guards 46 also protect the triggering shoulder 69 and the cross-head "H" from inadvertent contact with an object which could trigger the fastening device during handling.

Since the reaction force is spring induced and the spring 34 is always loaded, any relaxation resulting from vibration or compression is compensated by additional spring induced rotation of the rotor 32 thereby maintaining a nearly constant counter-clockwise retention biasing force on the rotor. Because the stored energy fastener utilizes or incorporates the principal of a threaded screw, with the spring applying force transmitted through the mechanical advantage of the housing ramps 50, the retention force is many times the spring force imparted to the rotor 32. In addition, depending on the slope of each ramp 50, the mating lug cam face angles and the coefficient of friction therebetween, any application of a force strong enough to dislodge the fastener device would likely cause destructive failure of the cross-head "H" prior to any such dislodging.

Releasing the retention force and separating the engaged fastener device merely requires the re-cocking of the fastener devices. Re-cocking may be accomplished by a suitable tool, such as the screwdriver blade 61, which axially displaces and winds the rotor counter-clockwise thereby placing the associated housing cross-slot side edges 42 and rotor lug corner junctures 80 into opposed mating locked engagement. It is also possible to release the cross-head "H" from its side of the panel 24 by employing a suitable tool to grip and rotate the cross-head clockwise, while axially displacing it, until each rotor lug corner Juncture 80 is moved into contact with its associated housing slotted passage side edge 42. An operator is thus free to manually separate the component fastening device 20 from the support panel member 24 while the fastener device is in its "cocked and armed" mode ready for subsequent re-engagement of its cross-head "H". It will be noted that the fastener device 20 must be separated from the mating surface of its support panel 24 to allow the rotor to be moved axially and return the lug corner junctures 80 into opposed contact with their associated housing slotted aperture side edges 42.

The requirement to separate the fastener device 20 from mating surface of its attached panel 24 to enable the rotor to be moved axially, so as to return the lug corner junctures 80 into opposed contact with their associated housing slotted aperture side flanks 42, implies that the first embodiment of the fastener must be used without other similar fasteners on the subassembly 21, or that all fasteners (if more than one) be released simultaneously. Because the fastener rotor 32 will remain stationary with respect to the housing 30 only when in two positions, those being "cocked and armed" and "fired" the fastener device can be said to be stable in two modes.

SECOND EMBODIMENT

A second embodiment of applicant's quick-connect stored energy fastening device is shown in FIGS. 15–24. Accordingly, like or similar elements of the second embodiment, corresponding to those of the first embodiment of FIGS. 1–14A, have been assigned the same reference numbers except that they have been primed. The stored energy fastening device 20' of FIGS. 15–24 incorporates three distinct modes of stability in counter-distinction the two modes of stability of the first embodiment.

The fastener device 20' three modes of stability are namely: (1) "cocked and locked", (2) "cocked and armed", and (3) "fired".

Figure 15:
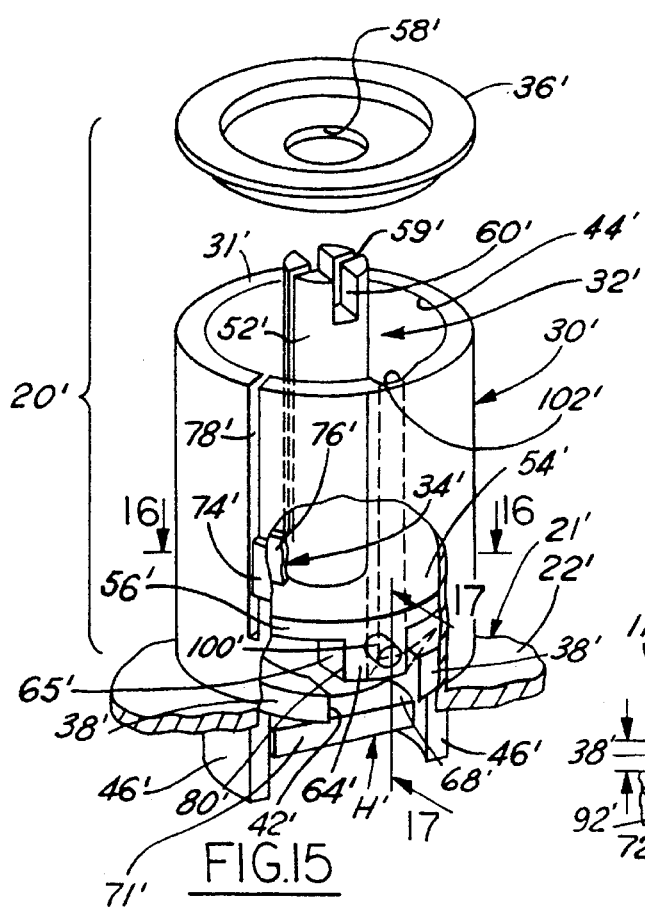
FIG. 15 is a perspective exploded view, similar to FIG. 5, showing a second embodiment of the invention which permits locking of the device when cocked to prevent unintended firing.

In its "cocked and locked" mode of FIG. 15 one or more fastener devices 20', integrated with a component 21', are adapted to be stabilized during fabrication enabling shipment in combination with the component 21'. It will be noted in FIG. 16 that the rotor 32' is wound in a counter-clockwise cocking direction through a predetermined angle of rotation that is of the order of five degrees greater than the rotational angle required to wind the first embodiment rotor 32 to its FIG. 10 cocked mode. At such a greater angle rotor engaging means, in the form of a locking pin 100', is free to be biased outwardly from the periphery of the rotor disc lug 64' and engage a vertically extending axial bore groove 102' establishing the fastener's "cocked and locked" mode.

Figure 19:
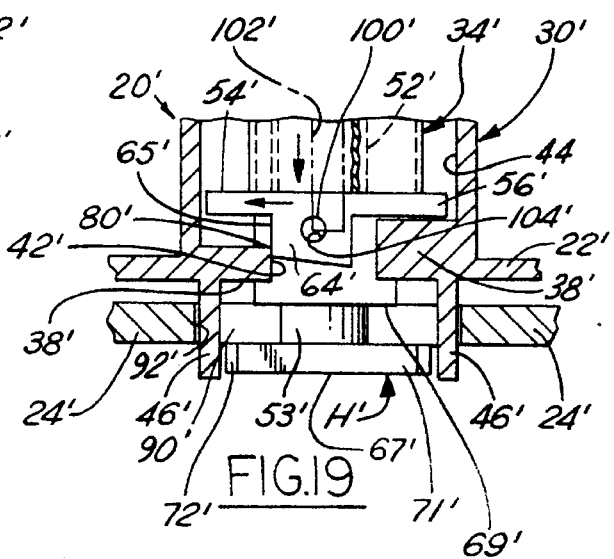
FIG. 19 is a view similar to FIG. 17 showing the fastener device of FIGS. 15–22 in its "cocked and armed" mode.
Figure 19A:
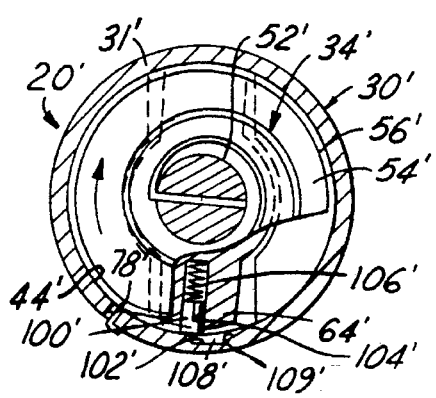
FIG. 19A is view similar to FIG. 16 showing the device in its "cocked and armed" mode.
Figure 20:
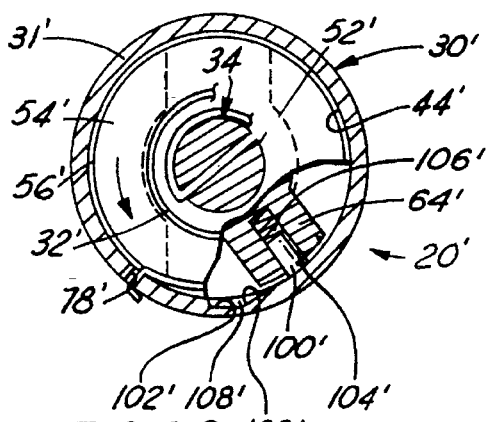
FIG. 20 is a view similar to FIG. 16 showing the fastener device with the rotor wound counter-clockwise through a determined radial angle to a position beyond its "cocked and locked" mode of FIG. 16.
Figure 22:
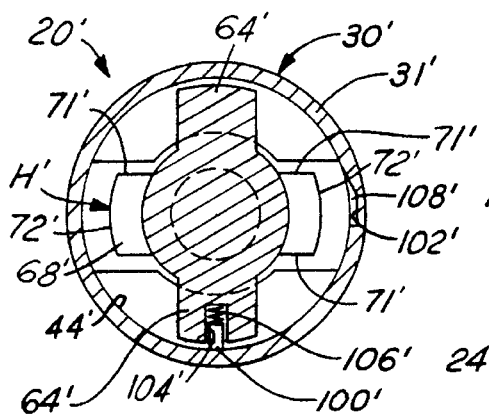
FIG. 22 is a plan view of the taken in the direction of the "FIG. 22" arrow in FIG. 21.
Figure 21:
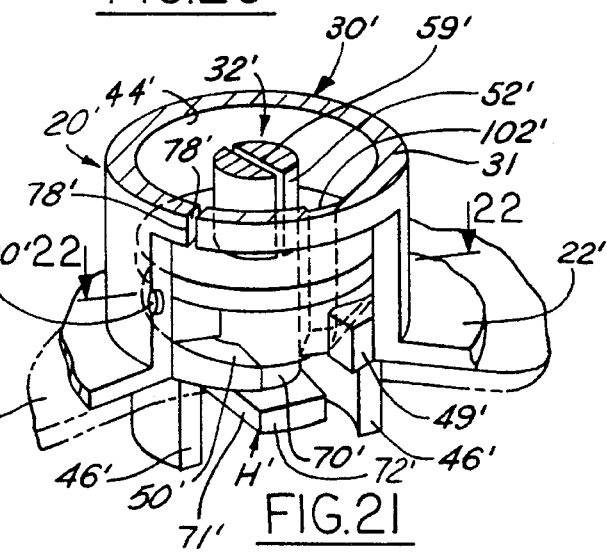
FIG. 21 is a fragmentary perspective view, with parts broken away, similar to FIG. 18 showing the fastener device in its "fired" mode.
Figure 23:
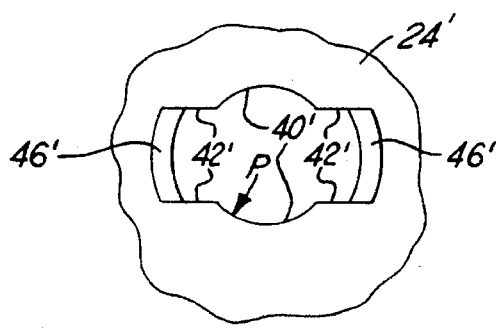
FIG. 23 is a detail bottom view of the housing showing the exterior of its base wall.

It will be appreciated that with the pin 100' captured in the groove 102' the rotor 32' is fixed and can't be inadvertently "fired", thus preventing the release of the stored energy of spring 34' and rotating latching head "H"' to its attaching position of FIG. 21. The "cocked and locked" mode enables a plurality of fastening devices 20' to be incorporated with the component 21' and shipped to an assembly plant in a manner that obviates accidental triggering. Further the "cocked and locked" mode permits the component 21', which has been previously attached to a support member 24', to be easily removed for servicing or replacement. The operator merely rotates each rotor 32' counter-clockwise, as viewed in FIG. 19A, from its "fired" mode to its "cocked and locked" mode. The "cocked and locked" mode allows, in the case of a plurality of fastening devices 20', for each device 20' to be in turn readily cocked and locked and the subassembly removed for repair or the like.

Applicant's second embodiment thus permits the use of any number of devices 20' for mounting a component. The operator merely winds the rotor 32' in a counter-clockwise cocking direction through a predetermined radial angle greater than that required to align its paired cocking surfaces. At such a radial angle, (approximately five degrees in the disclosed device), a locking means is provided on the rotor for releasable locked engagement with latching means on the housing 30'.

With reference to FIG. 15 a radially outwardly extending rotor locking pin 100' is shown in biased engagement with an axially extending locking groove 102' formed in the bore 44' of the housing 30'. With the locking pin 100' in the locking groove 102' ("cocked and locked" mode) the rotor 32' is retained in very near the same rotational position as in the "cocked and armed" mode, resulting in the fastener device 20' being unlatched from the support member 24' without the necessity of simultaneously separating the fastener device from the support member 24'. The second embodiment is particularly useful in the removal of subassemblies 21' containing a plurality of fastener devices 20' wherein a first fastener device 20' after being unlatched, is held in contact with the support member 24' by other fastener devices not yet unlatched. Additionally, the "cocked and locked" mode of the second embodiment is more resistant to being "fired" by vibration, jarring, or the like during handling than is the "cocked and armed" mode of either the first or second embodiment.

In the case of a plurality of fastener devices 20' the operator is allowed to progressively engage each locking pin 100' in its associated locking groove 102'. Presetting each fastener device 20' in its "cocked and locked" mode obviates a fastener coiled leaf spring 34' of one or more devices from releasing its stored energy. Upon setting each fastener device 20' in its "cocked and locked" mode the operator is free to separate the first sub-assembly member 21' from its support member 24'.

Figure 16:
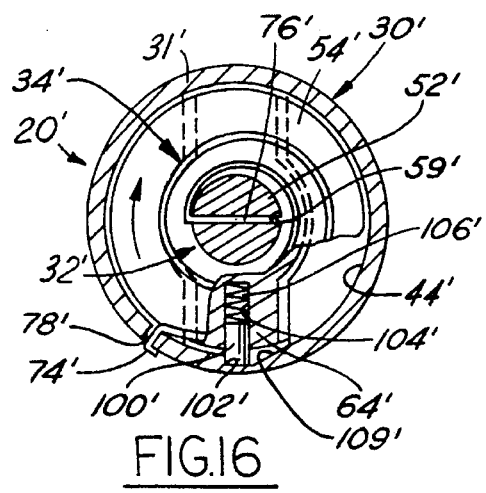
FIG. 16 is a horizontal sectional view, with parts broken away, taken on the line 16—16 of FIG. 15 with the rotor in its "cocked and locked" mode.
Figure 17:
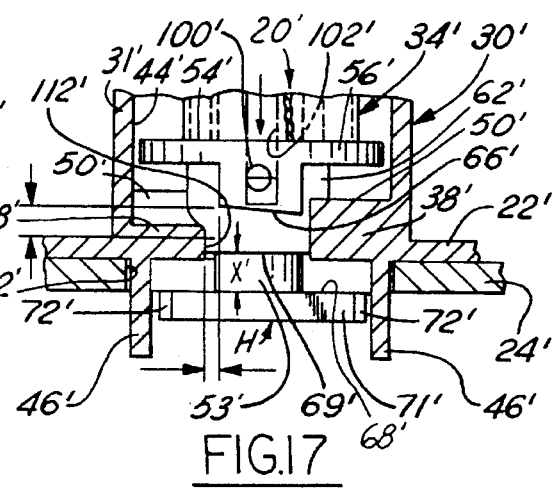
FIG. 17 is a fragmentary vertical sectional view, partly in elevation, taken generally on the line 17—17 of FIG. 15, showing the second embodiment in its "cocked and locked" mode.
Figure 18:
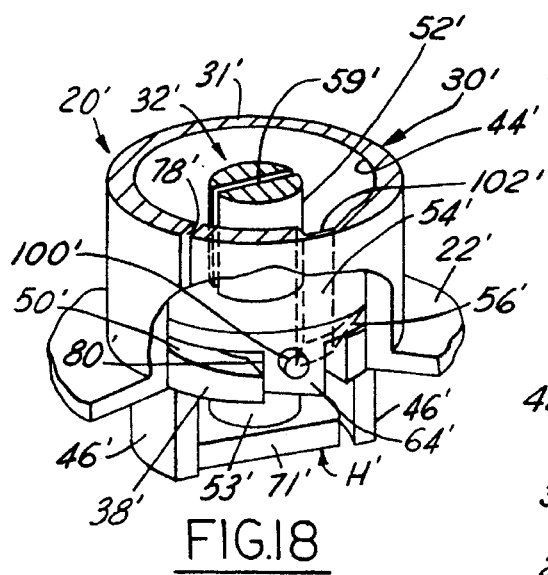
FIG. 18 is a fragmentary perspective view of the lower portion of the alternate fastening arrangement showing the "cocked and armed" mode; i.e., it is still "cocked" but no longer "locked"

As seen in FIG. 16 the locking pin 100' is telescopically received in a radial blind bore 104' provided in one of the rotor lugs 64'. A helical compression spring 106', trapped in the blind bore 104', urges the pin radially outwardly beyond the periphery of its associated lug 64' engaging the housing locking groove 102'. As the groove 102' prevents the rotor from being wound in a clockwise rotational direction, the fastener device is held in its "cocked and locked" mode. Thus, the device can not be "triggered" to release its stored energy as the locking pin 100' is trapped in the housing locking groove 102'.

Figure 24:
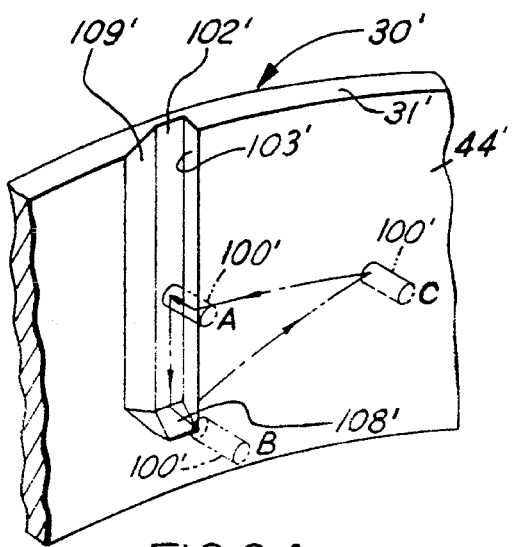
FIG. 24 is an enlarged fragmentary perspective view of a portion of the housing axial bore surface showing an axially extending engagement slot adapted to receive the rotor locking pin when the device is in its "cocked and locked" mode.

With reference to the schematic view of FIG. 24 the locking pin 100' is initially shown in its "cocked and locked" mode (Position A), with the pin outer free end urged or biased into contact with the locking groove inwardly facing wall 102' and the cylindrical surface of the locking pin adjacent to the pin outer end biased into contact with the locking groove radially extending side wall 103' i.e. the device cannot be triggered to release its stored energy.

In order for a fastener device 20' to be "triggered" to release the stored energy of the leaf spring 34' and engage the latching cross-head "H" the rotor must first be displaced axially. The operator presses downwardly on the free end of the rotor stem 52' causing the locking pin 102' to travel axially downwardly in the locking groove until its free end contacts a downwardly and inwardly sloped lead-out cam surface 108' shown in FIGS. 20 and 24, defining the locking groove closed lower end. The sloped ramp surface 108' cams the locking pin 100' into its blind hole 104' until the depressed pin is free of the groove 102' (FIG. 24), thereby allowing the pin free end to ride on the housing bore cylindrical surface 44' as the rotor 32' is wound into its "cocked and armed" position B.

With the device in its "cocked and locked" FIG. 15 mode, further downward axial displacement of the rotor 32' causes the locking pin 100' to exit the locking groove 102'. The rotor lug cocking lock surface 65' subsequently engages the housing cocking lock surface 42' (FIG. 19) in the "cocked and armed" mode, preventing the rotor from rotating further in a clockwise direction.

The fastener assembly 20' is now in its "cocked and armed" mode for triggering attachment of the latching cross-head "H" by axially forcing the housing tabs 46' further into the elongate slot 90' of the second panel member 24' in the manner described for the first embodiment. That is, by normal re-installation of the rotor latching cross-head "H" into the second panel member elongate slot 90'. As seen in FIG. 24, the triggering of the fastener device 20' causes the locking pin 100' to ride on the surface of housing socket 44' and move to Position C, which is the "fired" mode, (also shown in FIG. 21).

It will be noted in FIG. 24 that the fastener device is locking groove is formed with a sloped lead-in side face 109' adapted to allow the free end of the locking pin 100' to be received in the locking groove. The lead-in sloped side face 109' permits clockwise rotation of the rotor to its "cocked and locked" mode.

Figure 25:
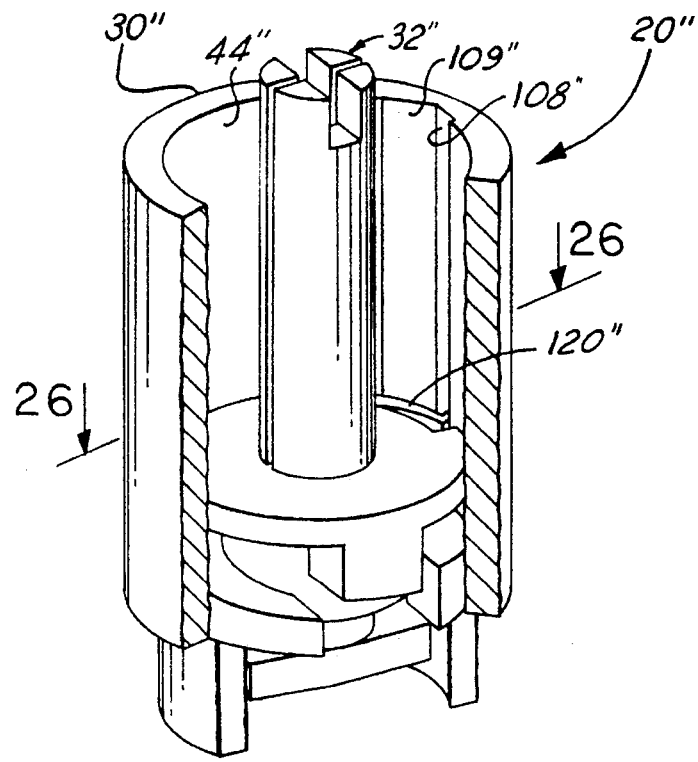
FIG. 25 is a perspective view, with parts broken away, similar to FIG. 15, showing an alternative locking means arrangement of the second embodiment of the stored energy fastener invention.
Figure 26:
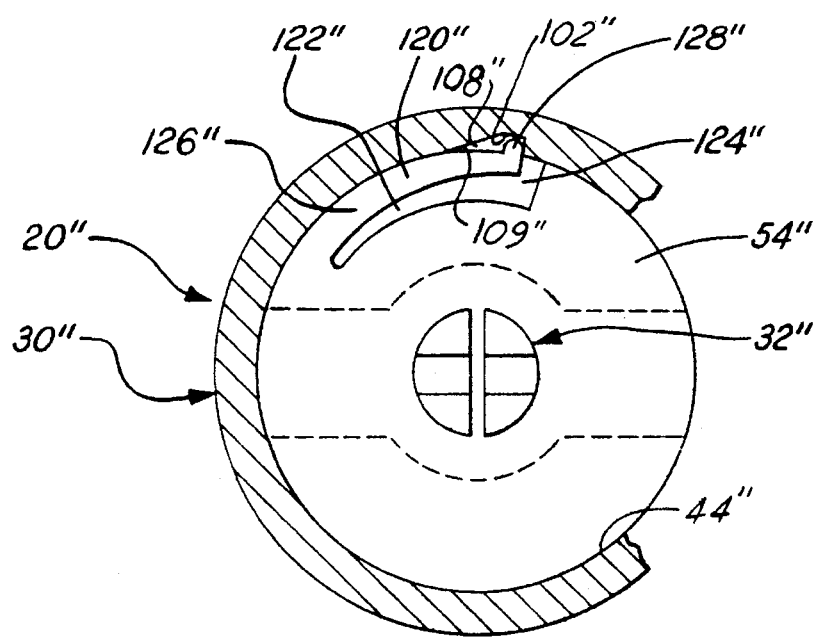
FIG. 26 is a horizontal sectional view, with parts broken away, taken on the line 26—26 of FIG. 25.

FIGS. 25 and 26 disclose an alternative locking means arrangement for the second embodiment fastener device 20' wherein like or corresponding elements or portions thereof are indicated by like numerals provided with double primes. The operation of the modified fastening device 20" is identical to the embodiment of FIGS. 15–24, i.e. it allows the rotor 32" to be cocked and locked without removing the fastener assembly 20" from the surface of a support member (not shown). See support member 24" in FIG. 17. The rotor 32" is molded from a suitable elastomeric material enabling the locking means to be integrally formed with the rotor.

FIG. 26 shows a cantilevered flexible arcuate spring leg segment 120" in the form of a peripheral portion of the rotor disc 54", separated by a coextensive arcuate slot 122" terminating in a radial slot portion 124". The spring leg segment 120" is tapered from a relative wide proximal one end 126" to a relatively narrow distal other end terminating in an outwardly extending radial locking foot portion 128". As best seen in FIG. 26 the locking foot portion 128", in its free or normal state, protrudes a predetermined radial distance beyond the periphery of the disc 54".

Thus, as seen in the "cocked and locked" mode of FIG. 25, the spring leg locking foot portion 128" is adapted to engage the internal axially extending locking groove 102" formed in the inner cylindrical surface of the housing axial socket 44". The locking foot portion 128" locks the rotor 32" against clockwise rotation, thus preventing the coiled spring (not shown but identical to 34' of FIG. 16) from releasing its stored attaching energy in a like manner as the locking pin 100' of the embodiment of FIGS. 15–24 The fastener device 20" in its FIG. 25 "cocked and locked" mode, cannot be triggered to release its stored energy because the spring leg locking foot 128" is trapped in the internal axially extending locking groove 102". The fastener device 20" is transformed from its "cocked and locked" mode of FIG. 25 to its "cocked and armed" mode (not shown) in the same manner as the embodiment of FIGS. 15–24 with a locking groove axially sloped ramp surface 108" forcing an inward radial deflection of the spring leg locking foot portion 128" out of the locking groove 102", permitting rotation to the "cocked and armed" mode.

Although the invention has been described by reference to two specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A quick-connect fastening device for releasably securing first and second components comprising:

a housing adapted to be secured to the first component, said housing formed with a cylindrical socket aligned on a principal axis, said socket being open at one end while its opposite end is formed with a pair of base segments defining a cross-slot having parallel edges symmetrically disposed about a socket diametrical axis, opposed arcuate cutouts concentrically formed in associated ones of said cross-slot edges, each said segment having an interior spiral ramp portion with said ramp portions providing a helical pitch thread support;

a rotor concentrically disposed in said socket, said rotor rotationally biased by spring means interconnecting said rotor and said housing, said rotor formed with a first stem having one end extending in one axial direction to said socket open end and an opposite end terminating in a radial disc, a concentric hub, extending from an underside of said disc, is journalled in said cutouts;

a pair of opposite lugs extend from said hub and are symmetrically disposed about a socket diametrical axis, each lug having an underface formed with a helical pitch surface mating with an associated ramp portion for axial threaded rotor travel;

said hub having a distal annular shoulder from which a second stem extends to said socket opposite end terminating in a latching cross-head adapted to extend through said cross-slot and having engaging surface means in opposed axially spaced relation to said shoulder, said cross-head being aligned on a socket diametrical axis normal to said lug diametrical axis;

said rotor adapted to be threaded in one rotational direction to a "cocked and armed" mode with said hub shoulder disposed axially below said segments with each lug rotationally biased against an opposed crossslot edge; whereby upon said cross-head being inserted through a second component slot the second component engages said hub shoulder and displaces said rotor in said one axial direction, such that each lug clears its associated crossslot edge thereby releasing a portion of the spring means stored energy and threads said rotor in an opposite rotational direction through a predetermined angle, whereby said cross-head engaging surface means urges said second component into releasable engagement with said first component.

2. The fastening device as set forth in claim 1 wherein said spring means is a coiled spring.

3. The fastening device as set forth in claim 1 wherein said spring means comprises a leaf spring coiled about said rotor first stem with said spring having an inner end connected to said first stem and an outer end connected to said housing.

4. The fastening device as set forth in claim 1 wherein each said base segment has an exterior surface provided with axially extending guide means adapted for insertion in the second component slot, whereby with said guide means inserted in the second component slot said hub shoulder is adapted for axial displacement by said second component.

5. The fastening device as set forth in claim 4 wherein said segment guide means defining a pair of opposed guides symmetrically disposed about said socket principal axis and spaced radially outwardly from an associated cross-slot edge arcuate cutout.

6. The fastening device as set forth in claim 5 wherein each said guide having a concavo-convex shape when viewed in horizontal section, and said pair of guides having a common center of curvature aligned on said socket principal axis.

7. The fastening device as set forth in claim 6 wherein said pair of guides symmetrically disposed about a diametrical guide axis of symmetry with said guide axis oriented ninety degrees to said cross-slot diametrical axis.

8. The fastening device as set forth in claim 7 wherein said second component slot is defined by a pair of opposed elongated side edges joined at their ends by a pair of opposed arcuate convex end edges having a common center of curvature, and said pair of guards of a size and configured so as to be snugly received through said second component slot such that said second component slot common center of curvature is adapted for alignment on said socket principal axis.

9. The fastening device as set forth in claim 1 wherein said second component comprising a member having a thickness substantially equal to but slightly less than a predetermined dimension measured between said cross-head bearing surface means and said hub shoulder.

10. A quick-connect fastening device for releasably securing first and second components comprising:

a housing adapted for securement to the first component, said housing formed with a cylindrical socket aligned on a principal axis, said socket being open at one end while its opposite end is formed with a pair of base segments defining a cross-slot having parallel edges symmetrically disposed about a diametrical axis of said socket, a pair of opposed arcuate concentric cutouts being formed in associated ones of said cross-slot edges, each said segment having an interior spiral ramp portion with said ramp portions providing a helical pitch thread support;

a one-piece rotor concentrically disposed in said socket, said rotor being rotationally biased by spring means interconnecting said rotor and said housing, said rotor comprising a first axial stem having one free end extending in one axial direction toward said socket open end and said stem opposite end terminating in a radial disc, a concentric hub extends from an underside of said disc and is journalled in said cutouts;

a pair of opposite lugs extend from said hub and symmetrically disposed about a socket diametrical axis, each said lug each having an underface formed with a helical pitch surface for mating with an associated ramp portion providing axial threaded rotor travel;

said hub having a distal shoulder from which a second stem extends in an opposite axial direction toward said socket opposite end terminating in a latching crosshead, said cross-head adapted to extend through said cross-slot and having surface means in opposed axially spaced relation to said shoulder, said cross-head aligned on a socket diametrical axis disposed normal to said lug diametrical axis;

said rotor adapted to be threaded in one rotational direction to a "cocked and locked" mode, wherein biased locking means on said rotor extending radially outwardly for releasable capture by groove means formed in said socket inner surface such that both said cross-head and said lugs are clear of said cross-slot;

said locking means operative, upon said rotor being axially moved in said opposite axial direction, freeing said rotor locking means from said housing groove means, whereby said spring means biases a respective pair of lug corner junctures into contact with a respective opposed cross-slot side edge providing a "cocked and armed mode"; and whereby upon said cross-head being inserted through a second component slot said hub shoulder and said lugs being displaced in said first axial direction, causing said device to be "fired" upon each said lug being axially released from its associated cross-slot edge, thereby releasing a portion of the stored energy of said spring means and threading said rotor in an opposite rotational direction through a predetermined angle, whereby said cross head engaging surface means urges said second component into releasable contact with said first component.

11. The fastening means as set forth in claim 10 wherein said locking means in the form of an outwardly extending resiliently biased locking member.

12. The fastening device as set forth in claim 11 wherein said locking means in the form of a radially outwardly extending spring-loaded locking pin telescopically received in a radial blind bore provided in said rotor.

13. The fastening device as set forth in claim 12 wherein said blind bore is formed in one of said rotor lugs.

14. The fastening device as set forth in claim 13 wherein said housing groove means in the form of an axially extending locking groove in said housing socket.

15. The fastening device as set forth in claim 14 wherein said locking groove defining a radially inwardly facing interior wall and a radially extending side wall, and wherein said device in its "cocked and locked" mode said locking pin having its free end biased into contact with said groove interior wall, and said locking pin having a cylindrical surface portion adjacent its free end biased into contact with said locking groove radially extending side wall.

16. The fastening device as set forth in claim 15 wherein said locking groove terminates at a closed lower end in a downwardly and inwardly sloped lead-out cam surface.

17. The fastening device as set forth in claim 16 wherein said device is adapted to be "cocked and armed" by said rotor being displaced axially downwardly causing said locking pin to travel axially in said locking groove until its free end contacts said cam surface depressing said pin into said blind bore thereby allowing said pin free end to engage said housing socket surface at a predetermined location, whereby said hub shoulder is disposed below said segments with each lug biased by said spring means against one cross-slot edge.

18. The fastening device as set forth in claim 11 wherein said rotor disc is formed of resilient elastomeric material, and wherein said locking means in the form of a peripheral portion of said rotor disc being radially displaced therefrom defining a cantilevered flexible arcuate-shaped spring leg, said spring leg tapered from a relatively proximal one end to a relatively narrow distal free end terminating in a radially outwardly extending locking foot portion, whereby with said device in its "cocked and locked" mode said spring leg locking foot portion is engaged in said locking groove and thereby locking said rotor against rotation.

* * * * *